United States Patent
Rudolph

(10) Patent No.: US 7,379,623 B2
(45) Date of Patent: May 27, 2008

(54) METHOD TO QUICKLY WARP A 2-D IMAGE USING ONLY INTEGER MATH

(75) Inventor: Eric Rudolph, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 10/927,371

(22) Filed: Aug. 26, 2004

(65) Prior Publication Data

US 2005/0243103 A1    Nov. 3, 2005

Related U.S. Application Data

(60) Provisional application No. 60/567,151, filed on Apr. 30, 2004.

(51) Int. Cl.
  *G06K 9/54*    (2006.01)
  *H04N 9/74*    (2006.01)
  *G09G 5/00*    (2006.01)

(52) U.S. Cl. ............... 382/293; 348/580; 708/442; 345/643

(58) Field of Classification Search ............ 382/293, 382/276, 277, 295–301, 307; 345/619–689; 348/580; 708/442
See application file for complete search history.

(56) References Cited

U.S. PATENT DOCUMENTS

| | | | |
|---|---|---|---|
| 3,710,323 A * | 1/1973 | Andrews et al. ............ 382/293 |
| 5,986,668 A | 11/1999 | Szeliski et al. |
| 5,987,164 A | 11/1999 | Szeliski et al. |
| 6,016,150 A | 1/2000 | Lengyel et al. |
| 6,018,349 A | 1/2000 | Szeliski et al. |
| 6,097,854 A | 8/2000 | Szeliski et al. |
| 6,674,916 B1 * | 1/2004 | Deman et al. ............ 382/276 |
| 7,016,539 B1 * | 3/2006 | Silver et al. ............ 382/216 |
| 7,215,801 B2 * | 5/2007 | Bueno et al. ............ 382/128 |
| 2004/0234163 A1 * | 11/2004 | Lee et al. ............ 382/298 |

OTHER PUBLICATIONS

K.H Chun and R.W.H. Lau. Contour-based Warping. CVGIP: Graphical Models and Image Processing. Academic Press, vol. 60 No. 5, 1998. 26 pages.
S. Seitz and C. Dyer. View Morphing. In Proc. of ACM Siggraph 1996. 10 pages.

(Continued)

*Primary Examiner*—Matthew C. Bella
*Assistant Examiner*—Randolph Chu
(74) *Attorney, Agent, or Firm*—Amin, Turocy & Calvin, LLP

(57) ABSTRACT

Systems and methods are disclosed that facilitate rapidly warping a two-dimensional image using integer math. A warping table can contain two-dimensional floating point output pixel offset values that are mapped to respective input pixel locations in a captured image. The warping table values can be pre-converted to integer offset values and integer grid values mapped to a sub-pixel grid. During warping, each output pixel can be looked up via its integer offset value, and a one-dimensional table lookup for each pixel can be performed to interpolate pixel data based at least in part on the integer grid value of the pixel. Due to the small size of the lookup tables, lookups can potentially be stored in and retrieved from a CPU cache, which stores most recent instructions to facilitate extremely rapid warping and fast table lookups.

24 Claims, 13 Drawing Sheets

OTHER PUBLICATIONS

G. Wolberg and T.E. Boult. Separable Image Warping with Spatial Lookup Tables. Proceedings of the 16th Annual Conference on Computer Graphics and Interactive Techniques, pp. 369-378, 1989.

Peter Mattson, et al., Generalized Image Warpign Using Enhanced Lookup Tables, IJIST(9), No. 6, 1998, pp. 475-483.

Yuefeng Zhang, A Fuzzy Approach to Digital Image Warping, IEEE CGA(16), No. 4, Jul. 1996, pp. 34-41.

* cited by examiner

METHOD TO QUICKLY WARP A 2-D IMAGE USING ONLY INTEGER MATH

CROSS-REFERENCE TO RELATED APPLICATIONS

This application claims priority to U.S. Provisional Patent Application Ser. No. 60/567,151 entitled A NOVEL METHOD TO QUICKLY WARP A 2-D IMAGE USING ONLY INTEGER MATH and filed Apr. 30, 2004, the entirety of which is incorporated herein by reference.

TECHNICAL FIELD

This invention is generally related to graphical image presentation in a computer environment, and, more particularly, to warping two-dimensional images using simple integer math.

BACKGROUND OF THE INVENTION

Digital image warping has been evolving for decades, and has grown to embrace a wide variety of applications, such as medical imaging, computer graphics, and computer vision. As computers become more powerful, digital image warping has become well suited to enhance such fields as special effects and image synthesis. Early discoveries related to remote sensors as well as recent developments in computer graphics and digital camera capabilities have contributed greatly to the field of image warping.

Image warping systems have become of interest in the area of computer-generated imaging technologies. For example, some digital warping methods use a technique known as "nearest neighbor" to warp a digital image. However, traditional nearest neighbor warping techniques are limited in precision and in their ability to present a smoothed, warped image to a user, often resulting in unwanted artifacts, or "aliasing," which produces jagged image lines (e.g., "jaggies"). Furthermore, nearest neighbor methods typically require substantial and time-consuming table-lookup protocols, further limiting their efficiency and/or effectiveness.

An unmet need exists in the art for systems and methods that facilitate high-speed, smoother image warping.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, includes an algorithm that facilitates warping a two-dimensional (2-D) image in a 2-D space given an input table that describes warp offsets per pixel. The system provides improved performance (e.g., speed) over existing systems, for example, due to pre-conversion of a 2-D offset table comprising floating-point values into a one-dimensional (1-D) offset table comprising integers and/or an algorithm that facilitates achieving sufficient precision for a desired result. For example, images captured by a high-resolution, wide-angle web camera (e.g., employed in a conference room environment) can be warped to facilitate mitigation of distortion via construction of a warping table that defines warped output pixel location based on input location. The warping table can contain integer pixel values and/or floating point values to permit greater warping precision.

According to an aspect of the invention, a set-up phase is provided, during which a conversion of 2-D floating point warping table values to a 1-D table of integer values is made. The invention can map output pixel location values (e.g., offset values) to input pixel location values. For example, floating point output pixel offset values can be converted to integer values via truncation in order to provide integer offset values for respective pixels that can be quickly accessed. The floating point remainders from converting floating point offset values to integers can be manipulated according to an algorithm and encoded into a single integer value, which represents a point on a sub-pixel grid. For example, if the grid is N units in one direction, the range of encoded integer values is from 0 to (N*N−1). The integer value permits rapid gleaning of information during an interpolation phase. Thus, a 2-D array of floating point offsets (or warp coordinates, which are mapped to integer input pixel coordinates) can be converted to a 1-D array of structures, wherein respective structures store an integer offset value and an integer grid value. During a warp, the 1-D array can be read (e.g., each structure can be read per pixel). From the grid value, a pixel center can be determined, which is the point from which a source pixel should be read given the whole pixel value offset. The grid value for a given pixel (e.g., given the offset value for the pixel) can be utilized to determine which surrounding pixels will contribute to the warped output pixel during interpolation.

According to another aspect of the invention, a warp component is provided that facilitates warping of a 2-D image using integer math. The warp component can facilitate pixel data conversion. For example, warped output pixel location data can be mapped to input pixel location data, and can be designated in floating point format to permit higher precision with respect to warped pixel location. The warp component can further generate integer offset values for output pixels from the floating point output pixel location information. Remainders from the floating point-to-integer conversions can be manipulated to derive a single integer grid value for each output pixel, which can facilitate interpolation of pixel information from surrounding pixels during a warping phase. The warp component can further comprise an encoder that facilitates encoding warped image data for output to a viewer.

To the accomplishment of the foregoing and related ends, certain illustrative aspects of the invention are described herein in connection with the following description and the annexed drawings. These aspects are indicative, however, of but a few of the various ways in which the principles of the invention may be employed and the invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
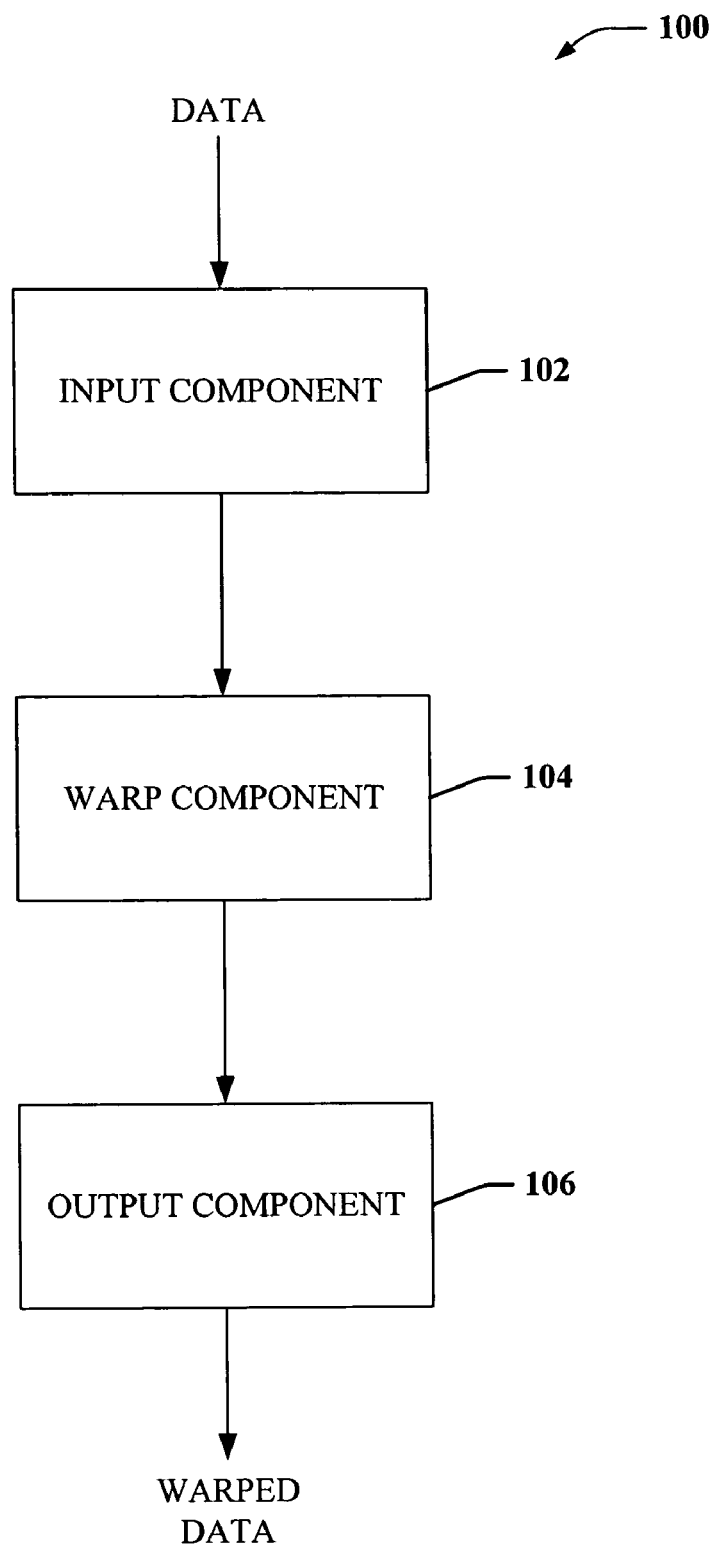
FIG. 1 is an illustration of an exemplary system 100 that facilitates rapid warping of a 2-D image using integer math.

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

FIG. 1 is an illustration of a system 100 that facilitates warping a 2-D image using integer math. The system 100 includes an input component 102 that is operatively coupled to a warp component 104, which is further operatively coupled to an output component 106. Data received by the input component 102 can include information associated with an image, such as, for example, two-dimensional arrays of static data elements (e.g., pixels), as is typically associated with an image captured by a digital camera. The input component 102 can provide pixel information related to a digital image to the warp component 104, which can warp the 2-D image and transmit the warped image data to the output component 106 for presentation to a user. The output component 106 can include, for example, a memory buffer, a CRT monitor, an LCD display, etc. The warp component 104 can convert 2-D output pixel offset information into integer values that represent pixel offset and/or a pixel center position within a sub-pixel grid for a given pixel (described in greater detail with reference to FIG. 6) and store such information in a 1-D array. The warp component 104 can employ information stored in the 1-D array (e.g., an array of structures) to mitigate a need for a double-table lookup, which in turn can greatly increase a speed with which a warping algorithm can warp an image.

Once data has been received by the input component 102, it can be transmitted to the warp component 104, which can reduce 2-D pixel information to 1-D integer information that can be stored in an easily accessible array to promote high-speed table lookups during warping. The input pixel values can be in integer format, and a warping table (e.g. offset table) can be specified in floating point format to provide greater precision with regard to output pixel location. The warp component 104 can warp incoming integer-based XY coordinates via the warping table into integer-based output XY offset values. The warp component 104 can precompute integer values that define pixel locations, thus mitigating a need for employing floating point mathematics during a warp, which in turn reduces occupation of processor resources and increases warping speed. To this end the warp component 104 can furthermore employ a warping algorithm that linearizes a table of XY offsets. For example, a lookup can be performed on output pixels, and for each output pixel a small 1-D table can be read to traverse neighboring pixels and interpolate fractional values there from in accordance with the warping algorithm.

Warping can be performed on a per-pixel basis until all pixels have been assessed and/or warped to generate a warped image. The warped image pixel information can be received by the output component 106, which can present the warped image data to a viewer. The output component 106 can include, for example, a memory buffer, a CRT monitor, an LCD display, or any other suitable display device. Additionally, the output component 106 can be operatively associated with a personal computer, a laptop, a PDA or other handheld, a cellular phone, etc.

Figure 2:
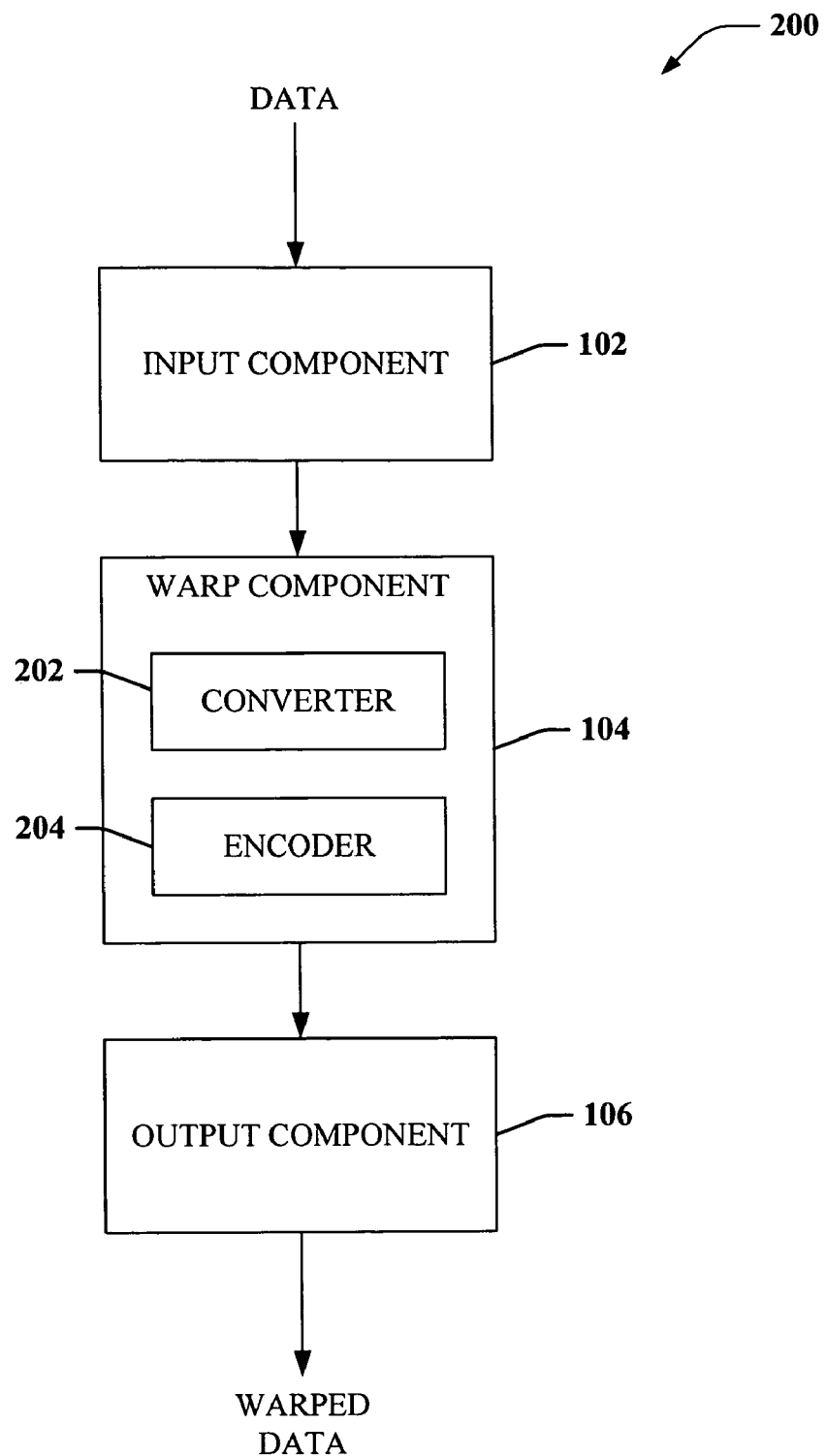
FIG. 2 is an illustration of an exemplary system 200 that facilitates rapid warping of a 2-D image using integer math wherein a warp component includes a converter and an encoder.

FIG. 2 is an illustration of a system 200 that facilitates warping a 2-D image via converting 2-D image information into 1-D integer information via a warping table that maps output pixel location to input pixel location. The system 200 includes the input component 102, which receives data associated with an image to be warped and ensures that such data is readable by the warp component 104. The warp component 104 receives input information from the input component 102 and employs various techniques to warp the image on a per-pixel basis before transmitting the warped image to the output component 106 for presentation to a viewer. The warp component 104 includes a converter 202 that receives information related to an image and translates integer XY pixel coordinate data, via 2-D floating point values associated with output (e.g., warped) pixel offsets, to integer values that can be coded by an encoder 204 and stored in an array (e.g., an array of structures) that is more accessible than conventional pixel data storage constructs. The integer values represent pixel offset values within the image (e.g., pixel locations in the image).

Floating point remainders that are obtained when the converter 202 translates a 2-D offset table (e.g., employing floating point offset values) to a 1-D offset table can be encoded via the encoder 204 into an integer number, which represents a point on a sub-pixel grid. For example, if the grid is N (where N is an integer greater than or equal to 1) units in one direction, the range of possible integer grid values can arbitrarily be set as 0 to (N*N−1) (e.g., height*width−1). The grid value can be employed to facilitate rapidly gleaning information during an interpolation phase. Thus, the 2-D array of floating point offsets (or warp coordinates) can be converted to 1-D integer offset values and stored in a 1-D array of structures, wherein respective structures store an integer offset value that represents the position of an output pixel in an image and an integer grid value that represents the position of a pixel center within the pixel offset region. During a warp, the 1-D array can be read (e.g., a structure can be read) on a per-pixel basis, wherein the offset to a source pixel and the integer grid value for that pixel are provided. From the grid value, a pixel center can be determined, which is the point from which the source pixel should be read given the whole pixel value offset. By utilizing the grid value, interpolation can be performed from the surrounding pixels in a precise fashion.

For example, if the warp component 104 employs a 3-by-3 sub-pixel grid for a given pixel, then the grid will contain 9 sub-regions of equal size, which can arbitrarily be numbered, for example, 0-8, although other numbering schemes are contemplated by the invention (e.g., 1-9, 100-108, 53-61, etc.). Due to the small size of a 3-by-3 table, lookups can be performed with great speed. In addition, table size can be kept small enough that table lookups can remain in, for example, an L1 or L2 processor cache, which can be read from and/or indexed with greater speed than a non-processor cache. It is to be appreciated that the sub-pixel grid is not limited to being square in shape (e.g., 3-by-3, etc.) but can assume other shapes and/or dimensions, and all such suitable shapes and/or dimensions are intended to fall within the scope and spirit of the invention.

Additionally, the warp component 104 can perform a lookup of tables for surrounding pixels based on the grid value of the source pixel, which can facilitate fractional contribution of a neighboring pixel(s) to the interpolated output pixel. Depending on the grid value, which can define the position of the center of the source pixel inside a pixel offset, lookups can include, for example, from 1 to L surrounding pixels, where L is an integer (e.g., 5). The surrounding pixels need not be directly neighboring; the 1-D table will define the neighboring pixels from which data should be interpolated. By employing fractional amounts of the L surrounding pixels, the warp component 104 can quickly provide a smooth, warped 2-D image to a display via the output component 106 for viewing by a user, which in turn facilitates performance improvements over conventional systems and/or methods.

Figure 3:
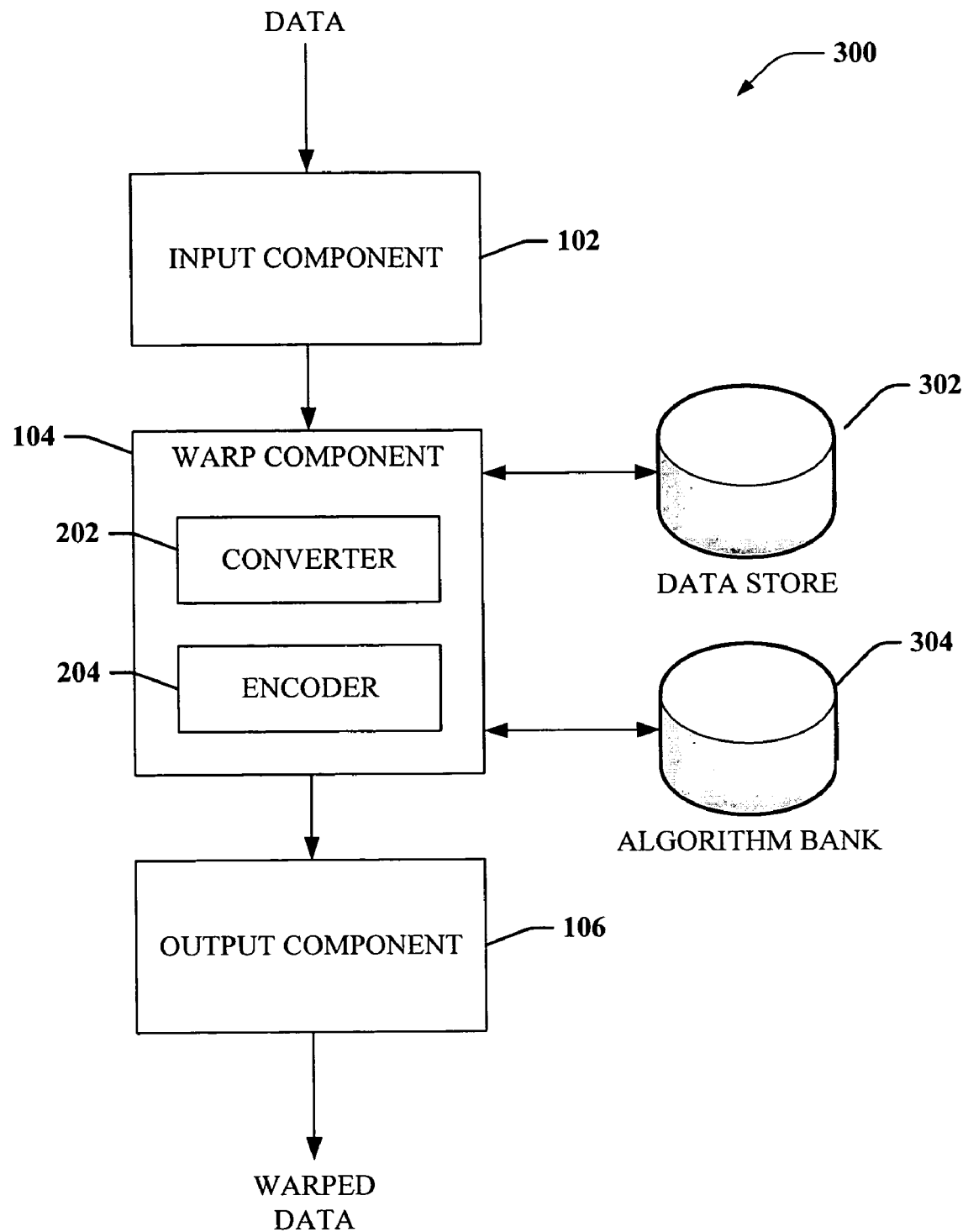
FIG. 3 is an illustration of an exemplary system 300 that facilitates rapid warping of a 2-D image using integer math wherein an algorithm bank and data store are associated with a warp component.

FIG. 3 is an illustration of a system 300 that facilitates warping a 2-D image via converting 2-D output pixel offset information, which is mapped to input pixel location information, into 1-D integer offset information and determining an integer grid value for each pixel that can be employed during an interpolation phase. The system 300 includes the input component 102, warp component 104, and output component 106, as described with respect to previous figures. Similarly, the warp component includes a converter 202 and encoder 204 as described with respect to FIG. 2. The system 300 further includes a data store 302 that is operatively coupled to the warp component 104 and can store data associated with image warping. Such data can be related to input image information and/or pixel information associated with an input image. Additionally, the data store 302 can retain information related to, for example, floating point pixel offset values, conversions thereof to integer offset values as performed by the converter 202, and/or the integer grid values that represent remainders obtained during conversion of floating point values to integer values. Furthermore, the data store 302 can facilitate retention of integer values (e.g., grid values, offset values, etc.) in one or more arrays (e.g., one or more arrays of structures, wherein respective structures contain each of a grid value and an offset value for a corresponding pixel). Pixel information related to warped images to be output to a user via the output component 106 can similarly be stored in the data store 302 in order to facilitate review of such warped images at the user's request. The data store 302 can be associated with a user's desktop computer, laptop, handheld, cellular phone, etc., or can be a data store associated with a processor therein, etc.

The system 300 further includes an algorithm bank 304 that stores algorithms (e.g., rules, formulas, etc.) that can be employed by the warp component 104 to warp an image. For example, the algorithm bank 304 can retain an algorithm for converting floating point offset values to integer offset values that can be utilized to quickly and smoothly warp an image. Moreover, the algorithm bank can store algorithms that facilitate pixel interpolation based on, for example, integer grid values and/or offset values stored in structures retained in the data store 302. Such algorithms are discussed in detail with regard to FIG. 7.

It will be appreciated that the data stores 302 and/or algorithm banks 304 (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the systems and methods is intended to include, without being limited to, these and any other suitable types of memory.

Figure 4:
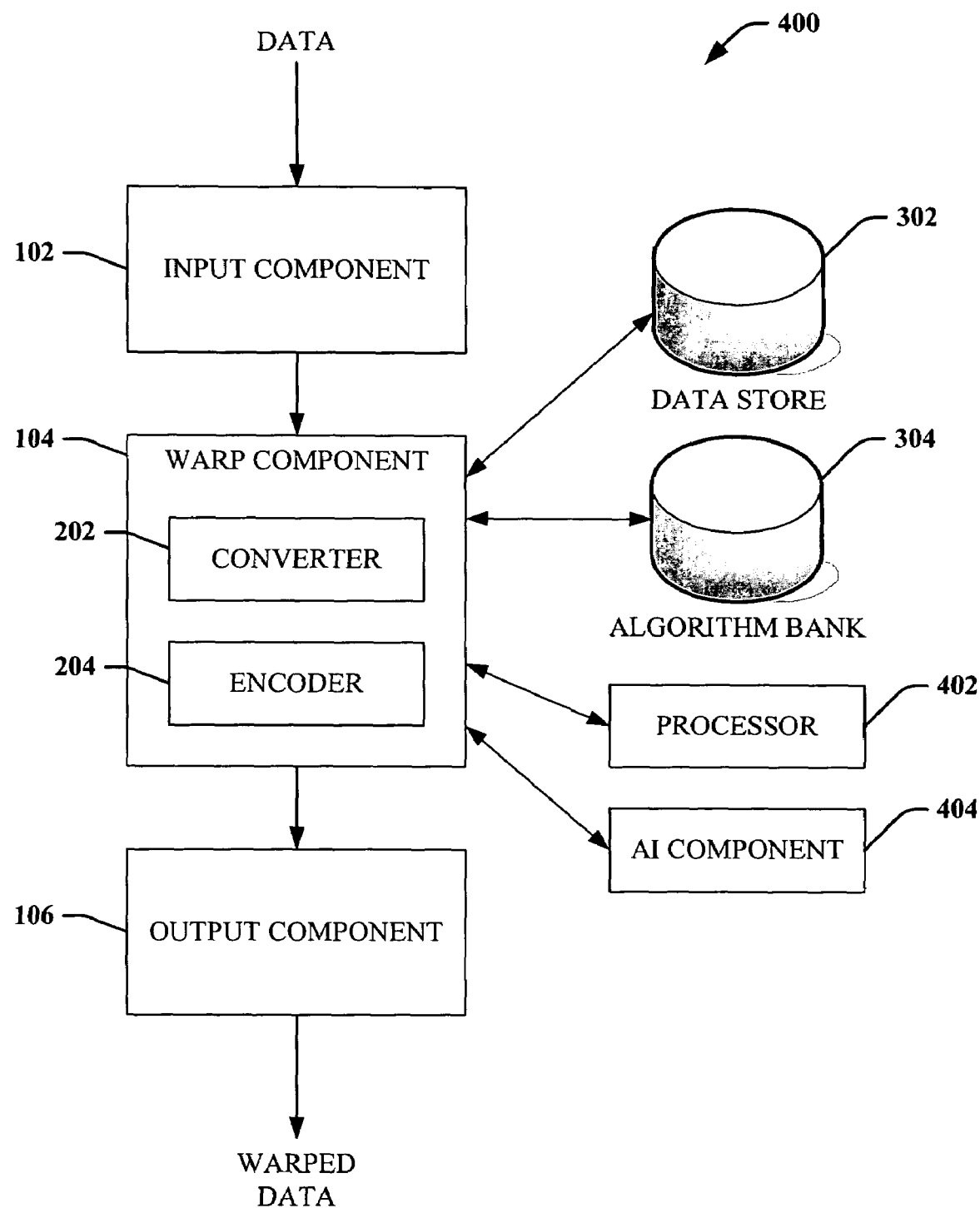
FIG. 4 is an illustration of an exemplary system 400 that facilitates rapid warping of a 2-D image using integer math wherein a warp component is associated with a processor and an artificial intelligence component that can make inferences regarding image warping.

Turning now to FIG. 4, a system 400 is illustrated that facilitates warping a 2-D image using integer math comprising a processor and intelligence that facilitates making inferences regarding warping an image. The system 400 includes the input component 102, warp component 104, and output component 106, as described herein. Similarly, the warp component includes a converter 202 and encoder 204 as described supra. The warp component 104 is operatively coupled to a data store 302 that retains information associated with warping an image and an algorithm bank 304 that stores algorithms related to performing an image warp, interpolating pixel data, etc., as described with reference to FIG. 3.

The warp component 104 is further associated with a processor 402 that analyzes data received by the warp component 104. It is to be appreciated that the processor 402 can be a processor dedicated to analyzing information received by the warp component 104, a processor that controls one or more components of the system 400, and/or a processor that both analyzes information received by the warp component 104 and controls one or more components of the system 400. It is to be appreciated that, although the processor 402 is illustrated as being operatively coupled to the warp component 104, it is not limited thereto, but rather can be coupled to any and all of the components of the system 400 in order to facilitate rapid warping of a 2-D image using integer values.

Additionally, the warp component 104 is operatively coupled to an artificial intelligence (AI) component 404 that can make inferences regarding operation of the system 300. For example, the AI component 404 can infer table size, sub-pixel grid size, etc., for a source pixel and/or surrounding pixels, based at least in part on a desired degree of resolution and/or precision, etc. According to this example, the AI component 404 can infer a suitable sub-pixel grid size based on information related to user desires, system settings, graphical output resources and/or capabilities, processor speed, memory constraints, etc. For instance, a user can be given options regarding a desired output image quality (low, medium, high, etc.), which the user can select prior to warping. If the user selects medium-quality, then the AI component 404 can infer that a sub-pixel grid with, for example, 3-by-3 dimensions is sufficient to render a warped image to the user while substantially mitigating occurrences of undesired artifacts associated with the warped image. If the user desires a higher-quality warped image, then the AI component 404 can infer that a more complex (e.g., 5-by-5, 7-by-7, etc.) sub-pixel grid is suitable to render a warped image to a user with greater reduction of aliasing of the warped image than can be achieved by a medium-quality (e.g., 3-by-3) sub-pixel grid resolution.

By way of example, the AI component 404 can determine that components associated with the image warp system 400 possess sufficient capabilities to provide superior quality warped images. For instance, if the AI component 404 determines that adequate processor speed, memory (RAM, ROM, etc.), display resolution, etc., is present, the AI component 404 can infer a minimum sub-pixel grid dimension, in order to provide a user with a superior warped image without noticeably increasing warp time and/or without overly consuming system resources. In this manner, warped image quality can be enhanced by taking advantage of available system resources without diminishing a user's viewing experience. It is to be appreciated that the preceding examples are illustrative and are not intended to limit the scope in which the AI component 404 renders inferences.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The AI component 404 provides for effecting various automated functionality in accordance with the invention. The AI component 404 can employ classifiers in connection with determination, inference, diagnostics, prognostics, and prediction. It is to be appreciated that classification in accordance with various aspects of the invention can employ a probabilistic and/or statistical-based analysis (e.g., factoring into the analysis utilities and costs) to prognose or infer an action that a user desires to be automatically performed. A classifier can be a function that maps an input attribute vector, $x=(x_1, x_2, x_3, \ldots, x_n)$, to a confidence that the input belongs to a class-that is, $f(x)=confidence(class)$. For example, a support vector machine (SVM) classifier can be employed—an SVM generally operates by finding a hyper plane that separates positive examples from negative examples in a multi-dimensional feature space. Other directed and undirected models classification approaches including, e.g., naive Bayes, Bayesian networks, decision trees, and probabilistic classification models providing different patterns of independence can be employed. Classification as used herein also is inclusive of statistical regression that is utilized to develop models of priority.

Figure 5:
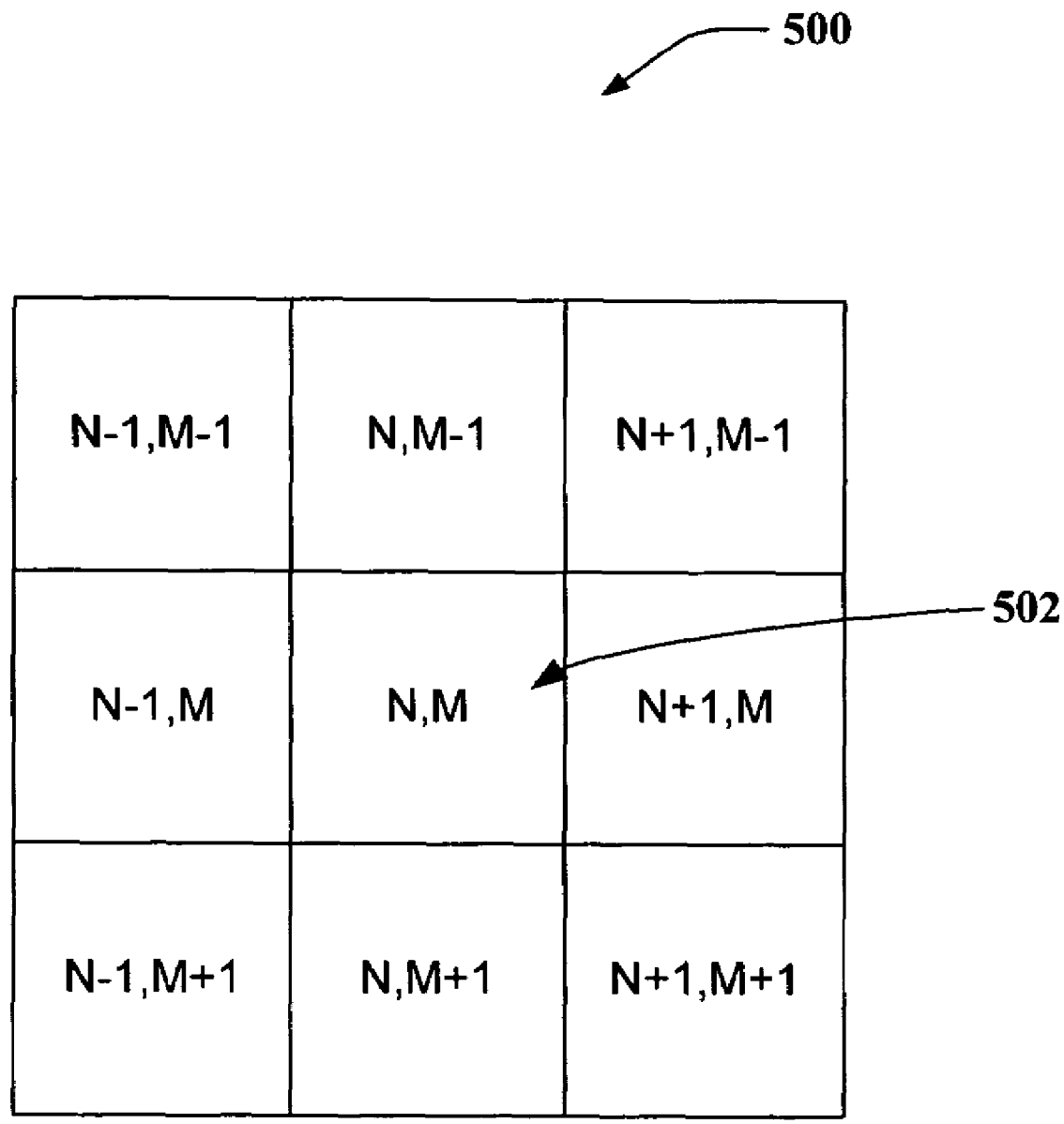
FIG. 5 is an illustration of a group of pixels numbered in relation to a source pixel to facilitate rapid assessment of pixel data interpolation.

FIG. 5 illustrates an exemplary 3-by-3 group of pixels somewhere in a 2-D image. Pixels are designated as a function of the row M, and column N (where M and N are positive integers), into which they fall in the image. As illustrated, pixels are provided with position designations relative to a source pixel N,M, 502, such that pixels in the column preceding the column in which N,M falls are designated as being in column N−1, etc. Likewise, pixels residing in the row below the source pixel 502 are designated as being in row M+1, etc. Such designations can additionally be provided and/or interpreted as integer offset values in order to identify pixel position quickly and efficiently. In order to facilitate presentation of a smooth warped image (e.g., mitigation of jagged edges due to displacement of the source pixel), pixel information from one or more neighboring pixels can be utilized, as described in the exemplary commented code below and with reference to FIG. 7.

Figure 6:
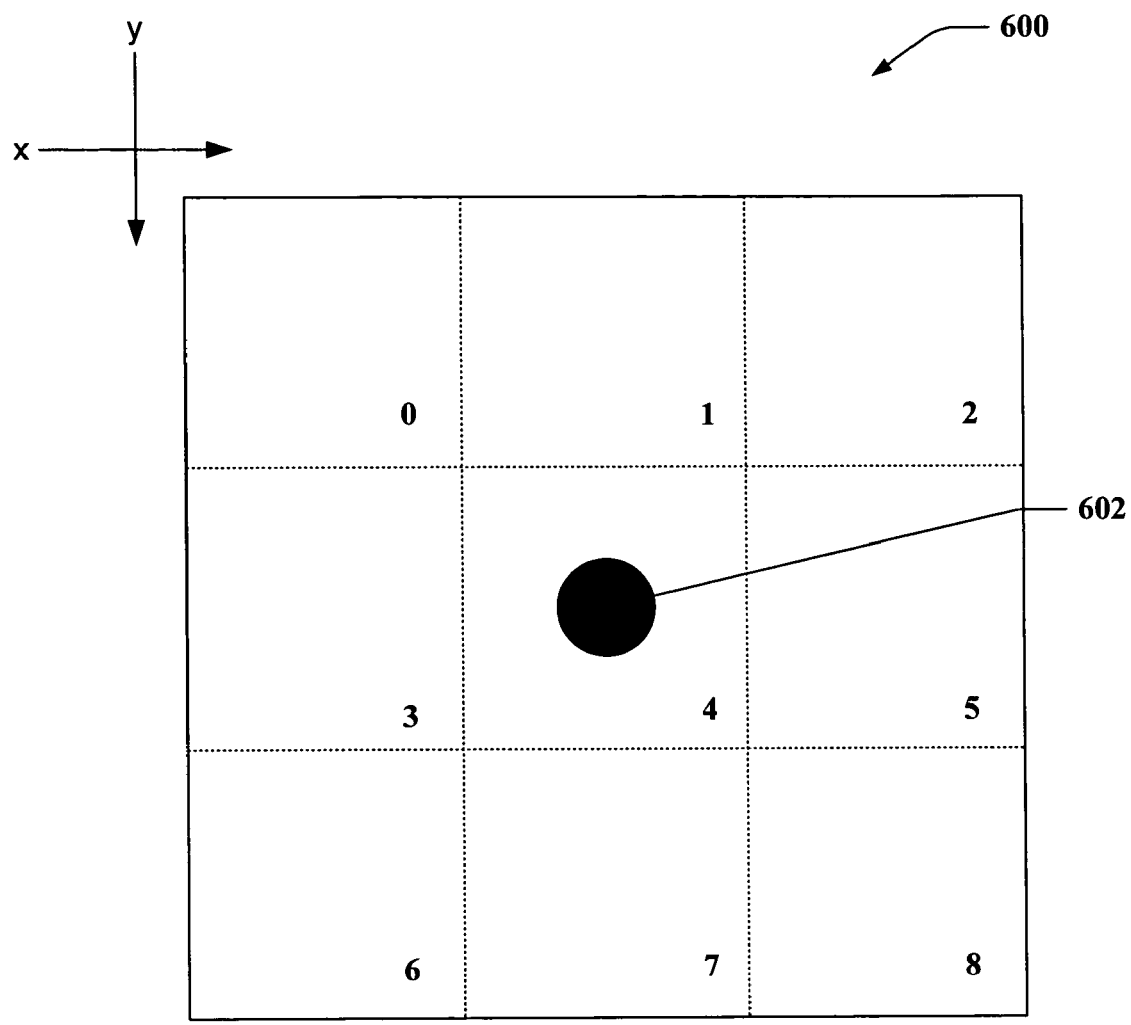
FIG. 6 is an illustration of a single pixel, expanded to illustrate a sub-pixel grid of the pixel with a pixel center ideally positioned in grid region 4.

FIG. 6 is an illustration of a source pixel, expanded to illustrate a sub-pixel grid 600 of the source pixel 502. The sub-pixel grid 600 is illustrated as having 3-by-3 dimensions, but is not limited to such dimensions. Rather the sub-pixel grid 600 can have any desired dimensions depending on desired precision and/or smoothness of the warped image. For instance, the sub-pixel grid can be constructed with 4-by-4 dimensions, wherein 16 sub-pixels can be provided and arbitrarily numbered 0-15. According to another example, the sub-pixel grid can be constructed to parse a pixel into 25, 36, 49, etc., sub-pixels depending on a user's particular warping needs and/or desired smoothness with regard to a warped image. Although even dimensions can be employed by the systems and methods described herein, odd dimensions have the added benefit of a central sub-pixel grid region, which can reduce the amount of code and/or resources expended to provide warping functionality.

Moreover, the dimensions of the sub-pixel grid 600 are not limited to being square (e.g., 2-by-2, 3-by-3, etc.), but rather can be any suitable dimensions (e.g., 2-by-3, 3-by-5, etc.) that facilitate rapid warping and reduction of artifacts. Respective sub-grid dimensions can furthermore be governed by appropriately fashioned interpolation algorithms.

According to FIG. 6, the pixel center 602 is located in sub-grid region 4, which is at the center of the sub-pixel grid 600. As such, the center of the source pixel is ideally positioned, and there is little, if any, possibility that any artifacts will result from a pixel positioned in this manner. However, pixels that are not ideally centered can result in artifacts that cause a jagged appearance, which is undesirable and detrimental to a user's viewing experience. Such artifacts can be prevented by the invention, as discussed in detail with reference to FIG. 7, infra.

The grid value for a given pixel can be derived via converting 2-D output pixel offset values (e.g., an x-coordinate and a y-coordinate, wherein the value of x increases from left to right and the value of y increases from top to bottom) into integer values (e.g., integer offset values). Remainders from the x and y offset conversions can be determined and can have a range of [0,1). For example, a decimal portion of a floating point offset value can be determined and multiplied by the width of the desired sub-pixel grid 600. For illustrative purposes, it can be assumed that the sub pixel grid 600 partitions a pixel in the second row and second column of an image. Because the pixel center 602 is centered within the pixel region 600, it can be assumed to have an x-offset of 2.5 (e.g. half-way across the pixel region) and a y-offset of 2.5 (e.g. half-way down the pixel region). Thus, the integer value for the y-offset is 2, and the remainder is 0.5. The x-remainder can be multiplied by the width of the grid (e.g., 3) to obtain a value of 1.5, which can be truncated to a remainder integer value of 1. The same method can be employed to determine a y-remainder integer value for the floating-point y-offset value, which will also equal 1 in this example. Then, the sub-grid region into which the pixel center falls can be determined by multiplying the y-remainder integer value by the width of the grid and summing the product with the x-remainder integer value, which will equal 4 according to the subject example (e.g., 1*3+1=4). Thus, the pixel center is determined to have an integer grid value of 4, which represents the center of the pixel. It is to be appreciated that the foregoing is exemplary in nature, and that any suitable grid dimensions can be employed in conjunction with the systems and methods of the invention.

Figure 7:
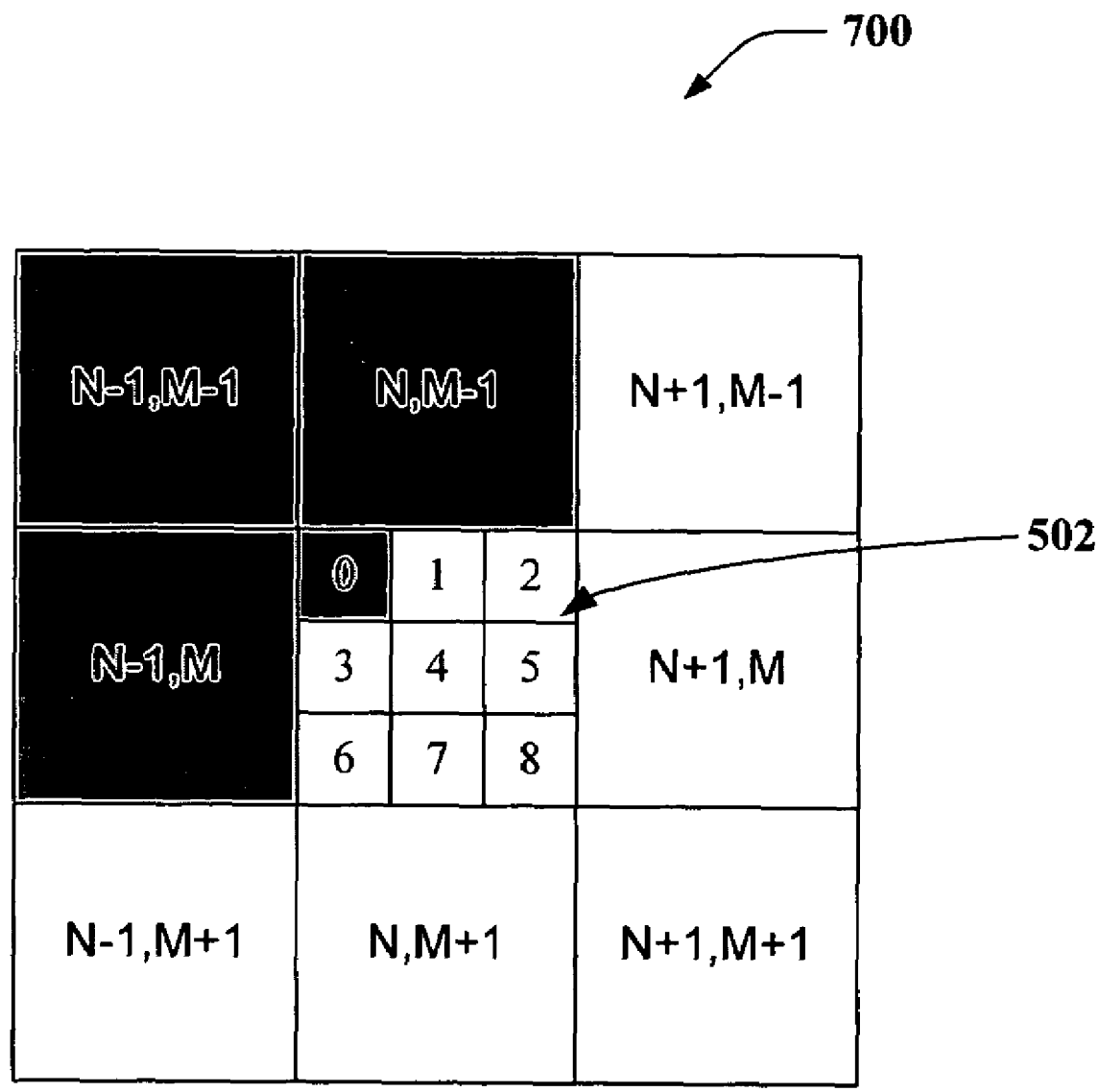
FIG. 7 is an illustration of a source pixel grid and neighboring pixels wherein the center of a source pixel is not ideally positioned.

FIG. 7 is an illustration of a 3-by-3 group of pixels 700 somewhere in an image, as described with reference to FIG. 6. The source pixel 502 at the center of the 3-by-3 group of pixels 700 has been partitioned into a 3-by-3 sub-pixel grid that facilitates identification of pixel-center location within the source pixel 502, which can be off-center as a result of image warping. Such pixel-center location information can be employed in conjunction with a warping algorithm that defines rules for utilizing pixel information from neighboring pixels based on the location of the pixel-center within the source-pixel area. According to this example, there are 9 possible sub-pixel regions in which the center of the source pixel can be located, arbitrarily labeled 0-8.

Exemplary algorithms that define rules for interpolating pixel information in such a 3-by-3 sub-pixel grid to mitigate artifacts during warping is presented below:

```
int XYoffsetTable[10][15] =
// 4/9ths of current, 2/9ths of sides, 1/9th of farthest
{ 114, 0, -1, 57, -1, 0, 28, 0, 1, 57, 0, 0, 0, 0, 0 },
// quad 0: source, up, up-left, left
// 2/3rds of current, 1/3rd of neighbor
{ 171, 0, -1, 85, 0, 0, 0, 0, 0, 0, 0, 0, 0, 0, 0 },
// quad 1: source, up
// 4/9ths of current, 2/9ths of sides, 1/9th of farthest
{ 114, 0, -1, 57, 1, 0, 28, 0, 1, 57, 0, 0, 0, 0, 0 },
// quad 2: source, up, up-right, right
// 2/3rds of current, 1/3rd of neighbor
{ 171, -1, 0, 85, 0, 0, 0, 0, 0, 0, 0, 0, 0, 0, 0 },
// quad 3: source, left
// All of current (See, e.g., Figure 6)
{ 256, 0, 0, 0, 0, 0, 0, 0, 0, 0, 0, 0, 0, 0, 0 },
// quad 4: source only
// 2/3rds of current, 1/3 of neighbor
{ 171, 1, 0, 85, 0, 0, 0, 0, 0, 0, 0, 0, 0, 0, 0 },
// quad 5: source, right
// 4/9ths of current, 2/9ths of sides, 1/9th of farthest
{ 114, -1, 0, 57, 0, 1, 28, 1, 0, 57, 0, 0, 0, 0, 0 },
// quad 6: source, left, down-left, down
// 2/3rds of current, 1/3rd of neighbor
{ 171, 0, 1, 85, 0, 0, 0, 0, 0, 0, 0, 0, 0, 0, 0 },
// quad 7: source, down
// 4/9ths of current, 2/9ths of sides, 1/9th of farthest
{ 114, 1, 0, 57, 0, 1, 28, -1, 0, 57, 0, 0, 0, 0, 0 },
// quad 8: source, right, down-right, down
{ 256, 0, 0, 0, 0, 0, 0, 0, 0, 0, 0, 0, 0, 0, 0 }
// quad 9: does not occur
```

Utilizing such rules in connection with FIG. 7, the "0" region (e.g., quad 0) of the 3-by-3 sub-pixel grid of the source pixel 502 is shaded to indicate that the pixel-center of the source pixel 502 is located therein. A such, the above-described algorithms dictate that pixel-information should be interpolated from neighboring pixels in the following weighted proportions: 4/9 from pixel N,M (source pixel 502); 2/9 from neighboring pixel N−1,M; 2/9 from neighboring pixel N,M−1; and 1/9 from caddy-corner pixel N−1, M−1. In this manner, the warped image pixel will include a portion of the original source pixel, as well as information derived from neighboring pixels in proportion to the respective proximities of the neighboring pixels to the source pixel.

If the pixel-center of the source pixel is determined to be located in quad 1, then the algorithm provides that 2/3 of the information associated with the warped pixel 502 should be retained, and 1/3 of the information associated with pixel N,M−1. A pixel center that is determined to be in quad 2 of the sub-pixel grid can borrow information from neighboring pixels according to the following agenda: 1/9 from the caddy-corner neighbor, N+1,M−1; 2/9 from neighbor pixel N+1,M; 2/9 from neighbor N,M−1. 4/9 of the pixel information associated with the source pixel N,M can be retained to provide a complete complement of pixel information in the warped image.

When the source pixel center is determined to reside in quad 3 of the sub-pixel grid, then 2/3 of the source pixel information can be retained and 1/3 of the pixel information of neighboring pixel N−1,M can be borrowed. Similarly, if a source pixel center falls into quad 5 or quad 7, then 2/3 of the source pixel information will be retained in the warped pixel information set while 1/3 of pixel information from neighboring pixels N+1,M and N,M+1, respectively, will be borrowed.

If, after warping, the source pixel center is determined to have remained in the center of the sub-pixel grid, quad 4, then all of the pixel information originally associated with the source pixel can be presented in the warped image.

According to this scenario, no smoothing is required because the position of the source pixel 502 has not changed. Accordingly, no artifacts will arise as a result of warping the pixel. Upon a determination that the center of the source pixel has migrated to quad 6 as a result of warping, warped pixel information can be generated by maintaining 4/9 of the source pixel's original information and supplementing it with 2/9 from pixel N−1,M; 2/9 from N,M−1; and 1/9 from N−1,M−1. In this manner, a complete set of information can be produced for the warped source pixel 502 at high speed and with minimal aliasing, resulting in a smoother warped line and an enhanced viewer experience. Similarly, if the center of the source pixel 502 is determined to have moved to quad 8, 4/9 of the original information associated with the source pixel 502 will be retained. In this example, the remainder of the information required to provide a full complement of pixel information can be borrowed from neighboring pixels according to the above-described algorithm: 2/9 from pixel N+1,M; 2/9 from N,M+1; and 1/9 from N+1,M+1.

Exemplary pseudo-code for building a 1-D offset table as described herein can be, for instance:

```
void MapTable::CheckBuildOffsetTable( )
{
  if( m_pLookup ) return;
  int TableWidth = GetOutwidth( );
  int TableHeight = GetOutHeight( );
  m_pLookup = new LookupPix[TableWidth * TableHeight];
  LookupPix * pRun = m_pLookup;
  for( int y = 0 ; y < TableHeight ; y++ )
  {
    for( int x = 0 ; x < TableWidth ; x++ )
    {
      float fy = *(float*) m_pMapY->GetData( x, y );
      float fx = *(float*) m_pMapX->GetData( x, y );
      int ix = int(fx);
      int iy = int(fy);
      pRun->m_q = int( ( fy - iy ) * 3 ) * 3 + int( ( fx - ix ) * 3 );
      // 0–8
      pRun->m_o = ( iy * m_nInwidth + ix ) * RGB_MULTIPLIER;
      pRun++;
    } // for x
  } // for y
}
```

Exemplary pseudo-code that illustrates a routine run per output pixel to perform the interpolation, in which lookups are performed on RGB source data, is presented below:

```
// find starting lookup pixel of input table
// THIS IS TABLE LOOKUP #1
//
LookupPix * pLookup = m_pLookup + TableWidth * y + x;
// "walk the source table" by moving pSourceWalk up, down, left,
// right based in direction vectors in pOffsetWalk
//
BYTE * pSrcWalkOrgin = pSrc + pLookup->m_o;
BYTE * pSourceWalk = pSrcWalkOrgin++; // start on a red pixel
register int * pOffsetWalk = PixelOffsetTable[pLookup->m_q];
register int Weight;
int r = 0;
int g = 0;
int b = 0;
// very fast inner loop
while( Weight = *pOffsetWalk++ )
{
  r += pSourceWalk[0] * Weight;
  g += pSourceWalk[1] * Weight;
  b += pSourceWalk[2] * Weight;
```

```
  pSourceWalk += *pOffsetWalk++;
}
// all rgb values are * 256
*pDst++ = ( r + 32768 ) / 65536; // output Red
*pDst++ = ( g + 32768 ) / 65536; // output Green
*pDst++ = ( b + 32768 ) / 65536; // output Blue
```

While, for purposes of simplicity of explanation, the one or more methodologies depicted herein, e.g., in the form of a flow chart, are shown and described as a series of acts, it is to be understood and appreciated that the invention is not limited by the order of acts, as some acts can, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Figure 8:
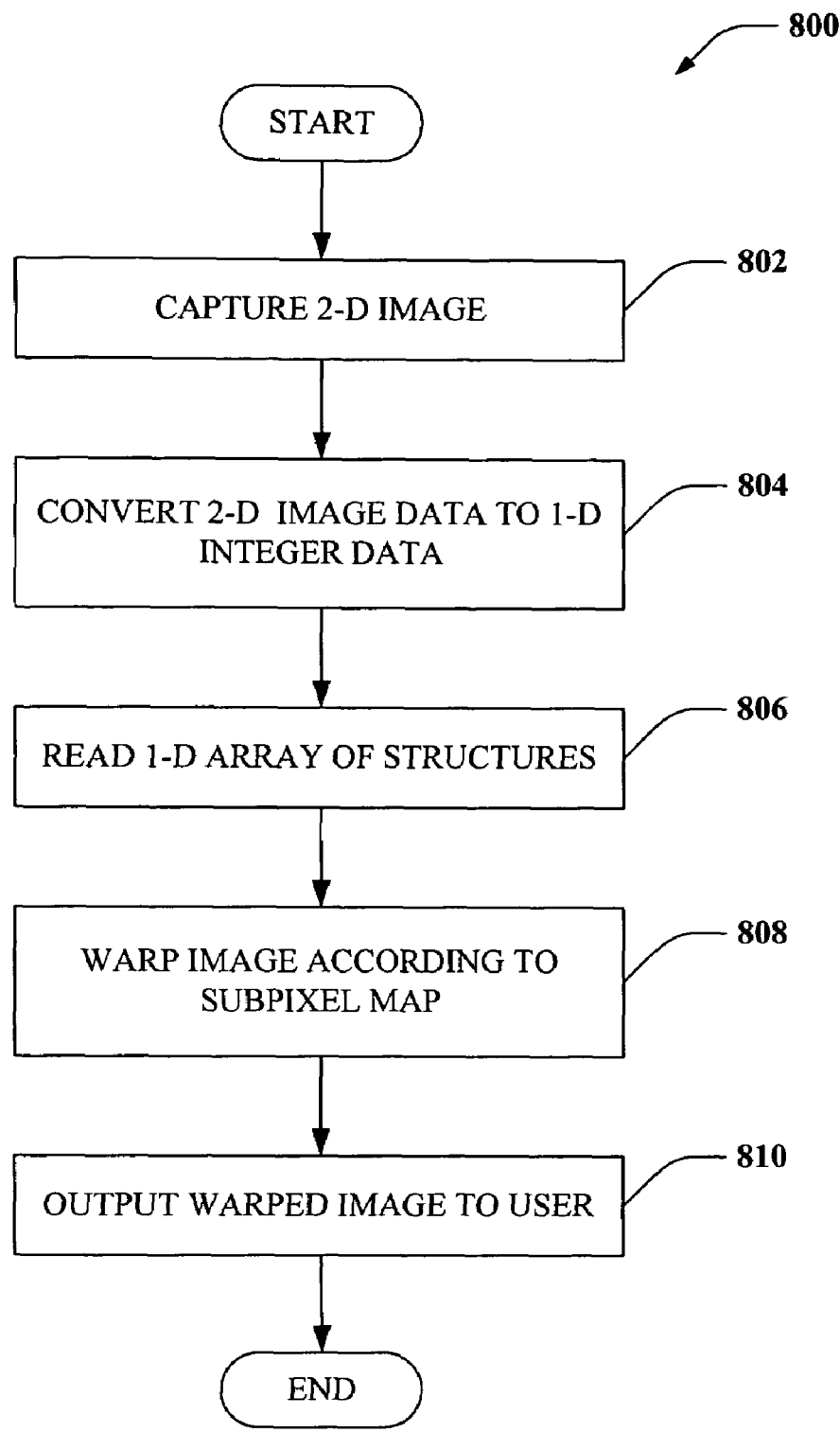
FIG. 8 is an illustration of an exemplary methodology 800 for rapid warping of a 2-D image using a pre-calculated 1-D array of look-up tables.

FIG. 8 is an illustration of a methodology 800 for rapidly warping a 2-D image via converting 2-D image pixel data into a 1-D integer data that can be stored in an array of structures, which in turn can be read and employed to warp the image according to a sub-pixel grid map. At 802, a 2-D image, such as a digitally captured picture, a scanned photograph, a still-frame captured from digital video, etc., can be input. At 804, a 2-D, floating point offset table associated with output pixels (e.g., where the 2-d offset table defines warp coordinates of pixels that are mapped to input pixels) in the 2-D image can be employed to generate a 1-D offset table comprising integer values. Additionally, remainders resulting from the conversion of the 2-D offset table to the 1-D offset table can be manipulated (e.g., as described supra with respect to FIG. 6) to generate an integer grid value for each pixel. An array of structures can be constructed to define the 1-D offset tables, and, due to their small size, table lookups can be stored in a CPU cache (e.g., an L1 or L2 cache), thereby facilitating warping an image with greater speed than conventional image-warping systems and methods permit. This 1-D array can be read with such speed at 806 because only a single-table lookup per pixel is necessary. For example, structures can be read to determine an offset value to a source pixel and an integer grid value for the source pixel. Based on the integer offset value of the pixel, a walk-around table lookup can be performed on the 1-D table for the pixel and the interpolation algorithms described supra can be employed to determine a weighted percentage of pixel data (e.g., color, weight, etc.) that should be interpolated from particular surrounding pixels for smooth warping at 808. The methodology 800 can be performed for each pixel in an image before a warped version of the original image is output to a user at 810.

Figure 9:
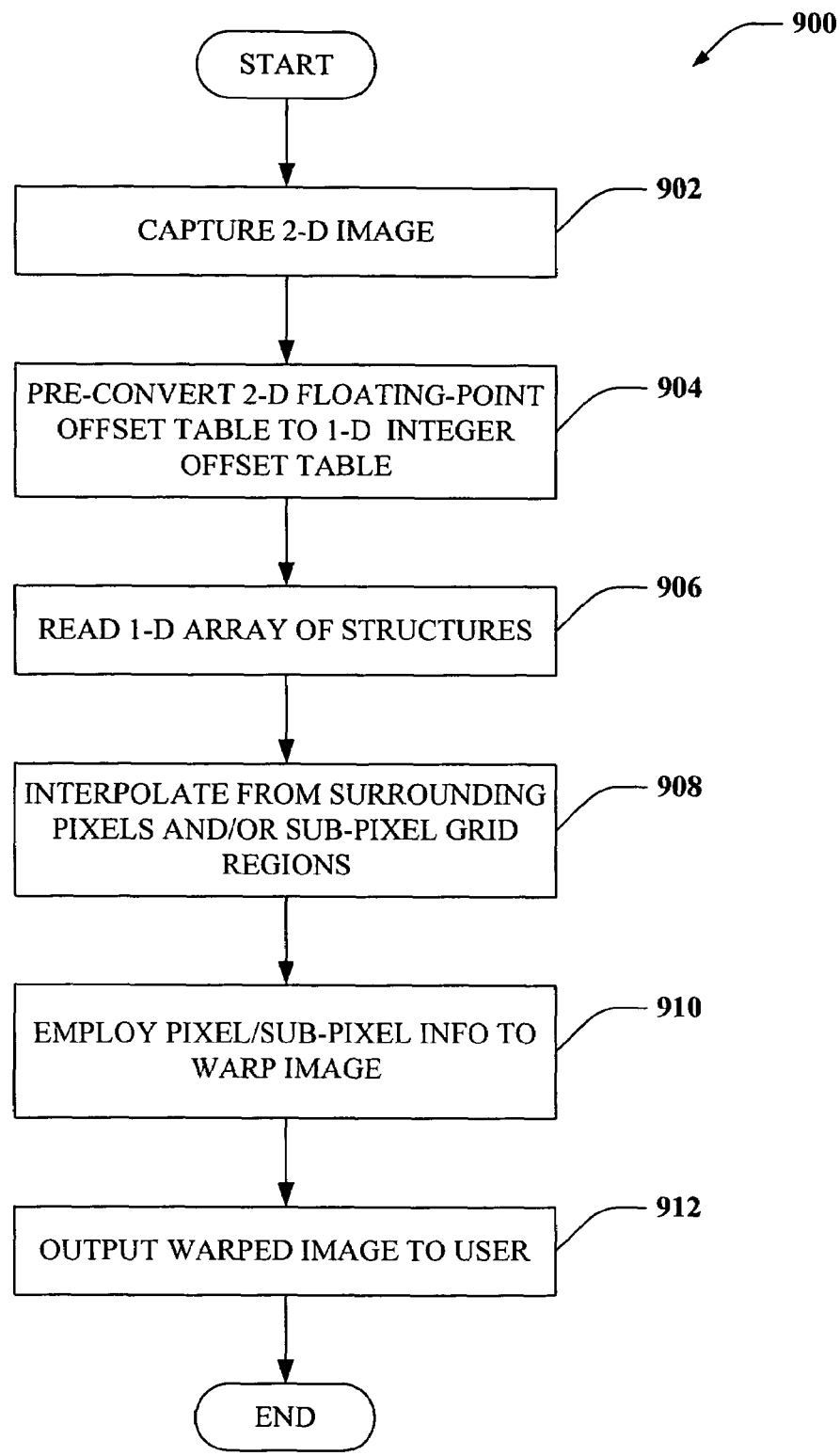
FIG. 9 is an illustration of an exemplary methodology 900 for rapid warping of a 2-D image using a pre-calculated 1-D array of look-up tables and an interpolation algorithm to mitigate artifacts that can arise during warping.

FIG. 9 is an illustration of a methodology 900 for rapid warping of a 2-D image using a pre-calculated 1-D array of look-up tables. At 902 a 2-D image is captured via, for example, a digital camera. At 904, 2-D floating point x- and y-offset values for output pixels can be converted to integer offset values. For example, the floating point offset values can be truncated to derive x- and y-integer offset values. The remainders from the truncation can be manipulated and encoded into a single integer number per pixel, which represents a point on a sub-pixel grid. For instance remainders from each of the x- and y-floating point value truncations can be multiplied by the sub-grid width and again truncated to obtain integer values for the respective remainders. Then, the integer associated with the y-offset reminder can be multiplied by the sub-grid width and summed with the integer associated with the x-offset remainder to obtain a single integer grid value for a given pixel. If the grid is N units in one direction, the range of the integer number can be arbitrarily described as 0 to (N*N−1). For example, if N=3 (e.g., defining a 3-by-3 grid), then the range of the integer grid value is from 0 to 8 (e.g., 3*3−1=8). This value facilitates rapid gleaning of information during an interpolation phase. Thus, the 2-D array of floating point offsets (or warp coordinates) is converted to a 1-D array of structures wherein each structure contains only an integer offset and an integer grid value. The array of structures can be constructed to define the tables, and such lookup tables can be small enough that lookups thereon can be stored in a CPU cache that stores most recent instructions, thereby facilitating warping an image far more rapidly than conventional image-warping systems and methods.

At 906, structures can be read to determine an offset value to a source pixel and an integer grid value for the source pixel. Based on the offset value of the pixel, a walk-around table lookup can be performed on the 1-D table for the pixel to lookup surrounding pixels, and an algorithm (e.g., dictated by the grid value) can be employed to determine a weighted percentage of pixel data that should be interpolated from surrounding pixels for smooth warping at 908. Thus, during a warp the 1-D array can be read (e.g., a structure is read) on a per-pixel basis, whereby the offset to the source pixel and the integer grid value are obtained. From the grid value, an ideal pixel-center can be determined, which is the point from which the source pixel should be read given the whole pixel value offset. Utilizing the grid value, interpolation can be performed from the surrounding pixels in a precise fashion. At 910, pixel data from surrounding pixels is borrowed according to the algorithms described supra in order to smoothly and quickly warp the image on a per-output-pixel basis. The methodology 900 can be performed for each pixel in an image and, at 912, the warped image can be output to a user.

Figure 10:
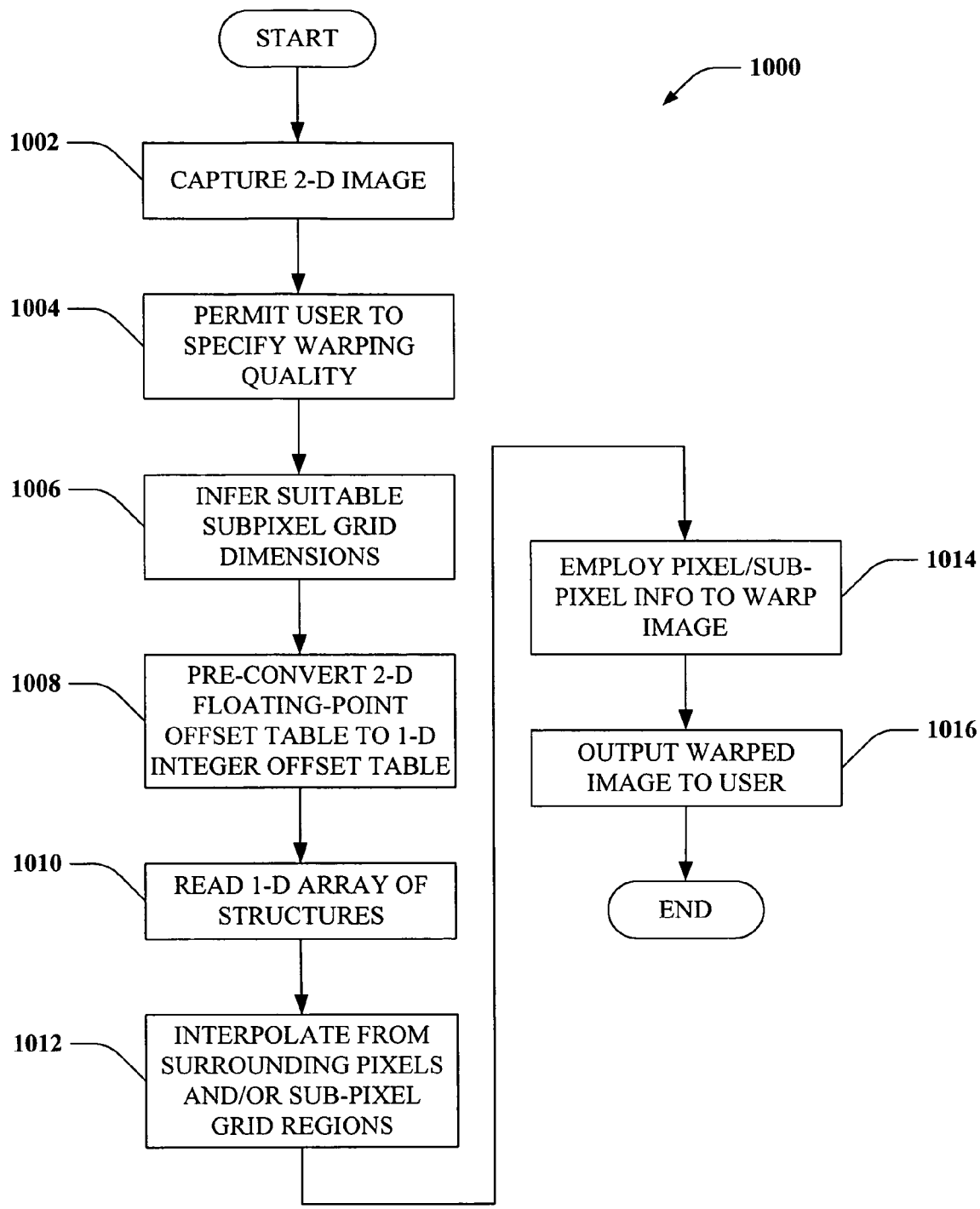
FIG. 10 is an illustration of an exemplary methodology 1000 that permits a user to specify image quality prior to warping using a pre-calculated array of lookup tables.

FIG. 10 illustrates a methodology 1000 for warping a 2-D image and mitigating unwanted artifacts in the warped image to provide smooth lines in the warped image while permitting a user to specify a desired image quality. At 1002, a 2-D image can be captured via a conventional device, such as a digital camera, a scanner, etc. At 1004, a user can be permitted to specify a desired image quality (e.g., low, medium, high, etc.). For example, a user who desires speed over quality can select to sacrifice quality in order to permit more rapid warping. Additionally, a user who for whom speed is not an issue (e.g., due to sufficient system resources, etc.) can select higher image quality. Once a user has specified a desired warp image quality, inferences can be made regarding suitable sub-grid dimensions. For example, a lowest quality warped image can include a 2-by-2 sub-pixel grid and employ an accordingly augmented algorithm, such that artifacts can be mitigated to a degree while image warping occurs as rapidly as possible. According to a related example, a user who has sufficient system resources (e.g., processor speed, available memory, display resolution, etc.) can select for higher warped image quality (e.g., 3-by-3, 5-by-5, etc.), as such high-quality will not likely be hampered by system limitations. Then, at 1006, sub-pixel grid dimensions can be inferred. Depending on the complexity of the sub-pixel grid, the algorithm described above can be appropriately augmented to reflect variations in the percentage of information borrowed from neighboring pixels.

At 1008, a 2-D, floating point offset table associated with output pixels in the 2-D image can be converted to a 1-D offset table that includes integer values. Additionally, remainders resulting from the conversion of the 2-D offset table to the 1-D offset table can be manipulated (e.g., as described supra with respect to FIG. 6) to generate an integer grid value for each pixel. 1-D offset tables for pixels can then be represented in an array of structures, and the table lookups can be stored in a CPU cache (e.g., and L1 or L2 cache) to permit faster warping than conventional systems permit. At 1010, the structures can be read to determine an integer offset value and an integer grid value associated with a source pixel. A walk-around table lookup can be performed on the 1-D table for the source pixel based on the pixel offset value, and an algorithm can be employed to determine a weighted percentage of pixel data that should be interpolated from surrounding pixels for smooth warping at 1012. At 1014, pixel data from surrounding pixels can interpolated to smoothly and quickly warp the image on a per-output-pixel basis. The methodology 1000 can be performed for each pixel in an image and, at 1016, the warped image can be output to a user.

Figure 11:
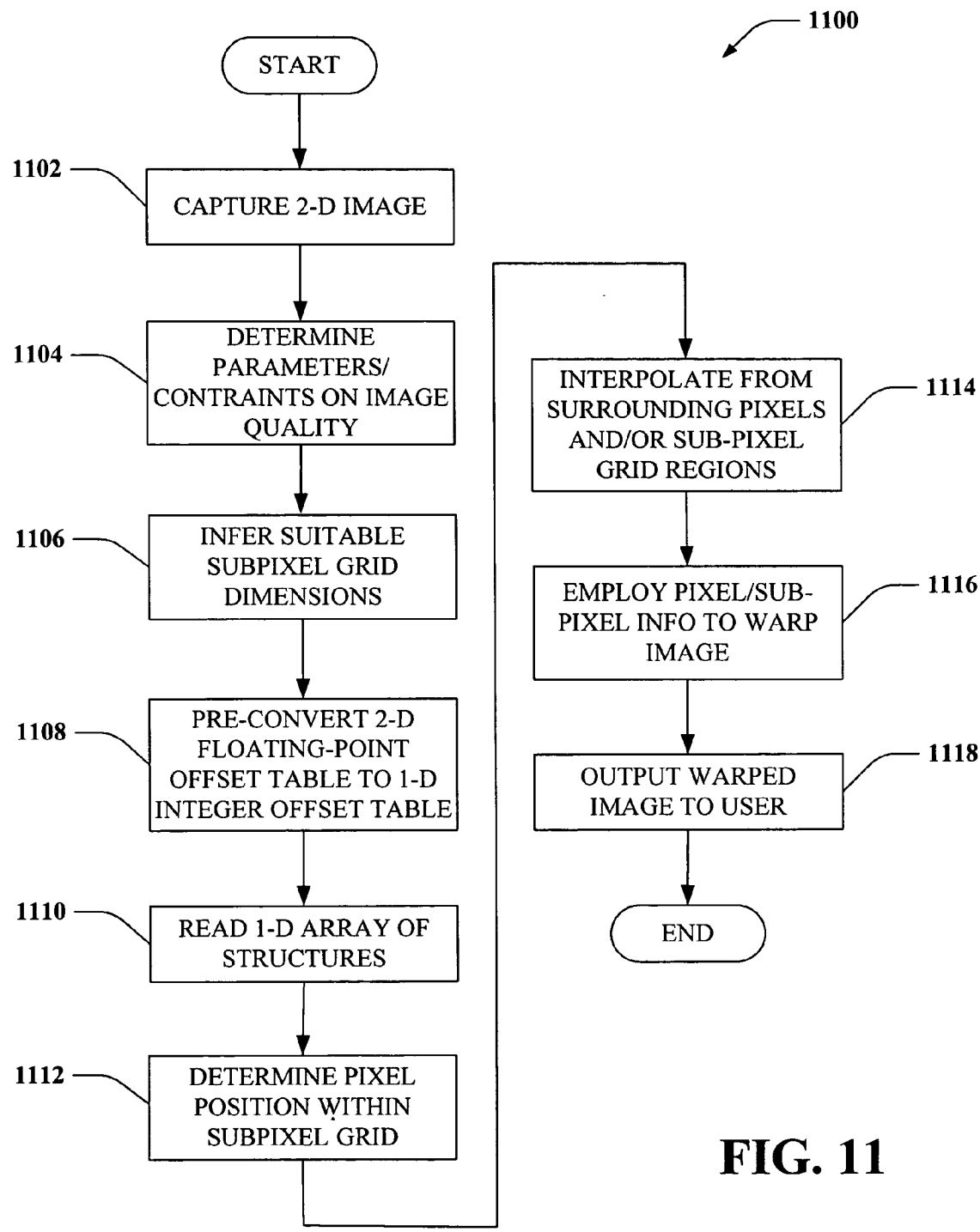
FIG. 11 is an illustration of an exemplary methodology 1100 that permits rapid warping of a 2-D image using a pre-calculated 1-D array of look-up tables and facilitates making inferences regarding a suitable warped image quality based at least in part on perceived display device capabilities.

FIG. 11 is an illustration of a methodology 1100 for high-speed image warping and alias reduction to provide smooth, warped images quickly. At 1102, a 2-D image can be captured via a conventional device, such as a digital camera, a scanner, etc. At 1004, a determination can be made regarding output device capabilities, such that image quality (e.g., low, medium, high, etc.) can be adjusted in the event that an output device is determined to have capabilities that substantially deviate from an expected value. For example, upon a determination that a given device has limited capabilities, a determination can be made to warp an image at a lower sub-grid resolution. An exemplary lower-quality warped image can include a 2-by-2 sub-pixel grid and employ an accordingly augmented algorithm, such that artifacts can be mitigated to a degree while image warping occurs as rapidly as possible. According to a related example, upon detection of greater-than-average system resources (e.g., processor speed, available memory, display resolution, etc.) higher warped image quality (e.g., 3-by-3, 5-by-5, etc.) can be provided, as such high-quality will not likely be hampered by resource limitations. Based upon such determinations, the dimensions of the sub-pixel grid can be inferred at 1106. Depending on the complexity of the sub-pixel grid, the algorithms described above can be appropriately augmented to reflect variations in the percentage of information borrowed from neighboring pixels.

At 1108, a 2-D, floating point offset table, which defines output pixel locations based at least in part on input pixel location information in the 2-D image, can be converted to a 1-D offset table that includes integer values. Additionally, remainders resulting from the conversion of the 2-D offset table to the 1-D offset table can be manipulated (e.g., as described supra with respect to FIG. 6) to generate an integer grid value for each pixel. 1-D offset tables for pixels can then be represented as an array of structures, and at 1110, the structures can be read to determine an offset value and an integer value associated with a source pixel. A walk-around table lookup can be performed on the 1-D table for the source pixel based on the pixel offset value, and an algorithm can be employed to determine a percentage of pixel data that should be interpolated from surrounding pixels for smooth warping at 1112. Additionally, because the tables upon which the lookups are performed are small (e.g., grid values can only vary from 0 to N*N−1, etc.), lookups can be stored in the L1 or L2 processor cache, facilitating faster warping than conventional methods permit. At 1114, pixel data from surrounding sub-pixel regions in the pixel grid is borrowed to smoothly and quickly warp the image on a per-output-pixel basis. The methodology 1100 can be performed for each pixel in an image and, at 1116, the warped image can be output to a user.

Figure 12:
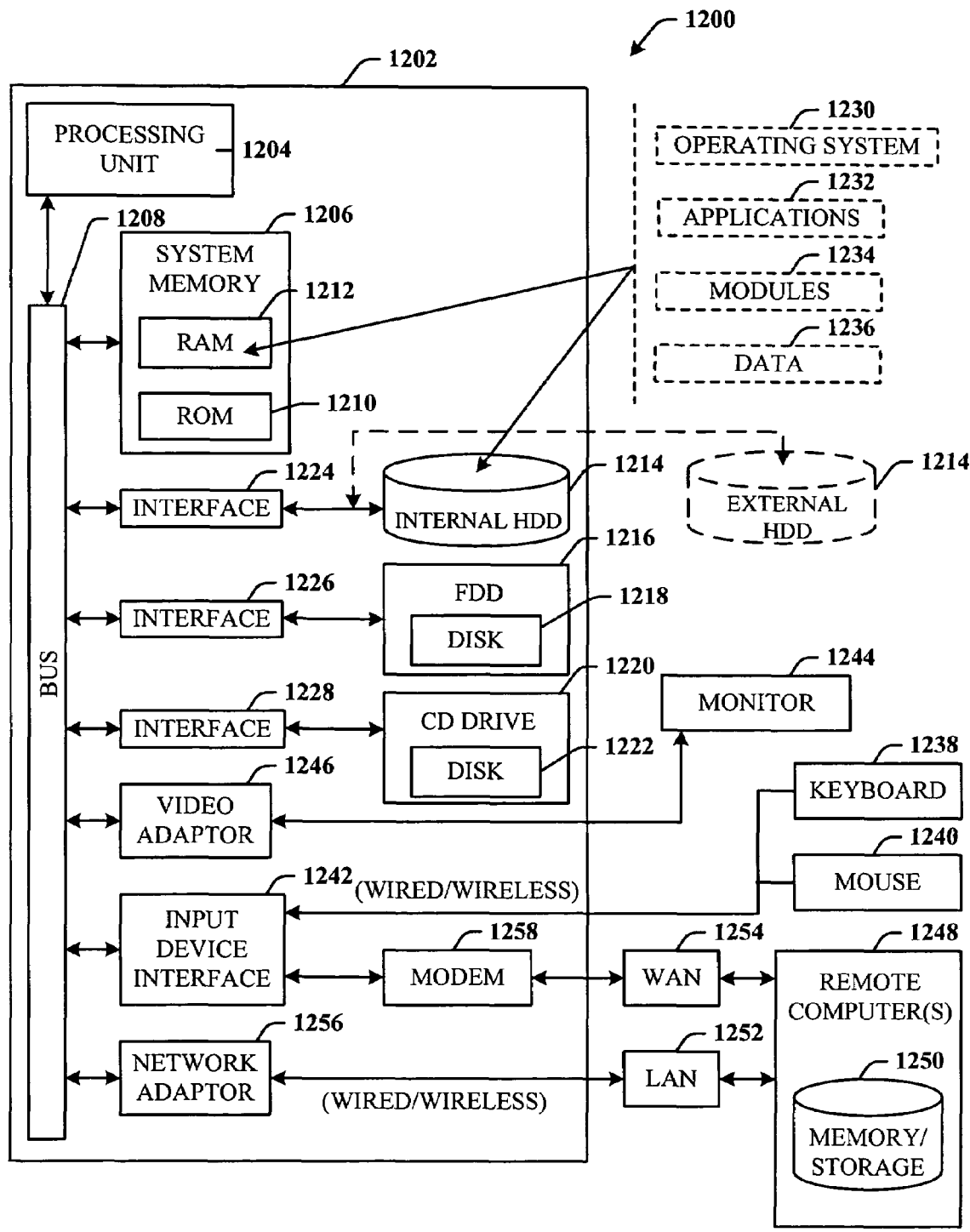
FIGS. 12 and 13 illustrate exemplary computing environments in accordance with various aspects of the invention.

Referring now to FIG. 12, there is illustrated a block diagram of a computer operable to execute the disclosed architecture. In order to provide additional context for various aspects of the invention, FIG. 12 and the following discussion are intended to provide a brief, general description of a suitable computing environment 1200 in which the various aspects of the invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 12, there is illustrated an exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 may be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up.

The computer 1202 further includes a hard disk drive 1214, a magnetic disk drive 1216, (e.g., to read from or write to a removable disk 1218) and an optical disk drive 1220, (e.g., reading a CD-ROM disk 1222 or to read from or write to other high capacity optical media such as Digital Video Disk (DVD)). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The drives and their associated computer-readable media provide nonvolatile storage of data, data structures, computer-executable instructions, and so forth. For the computer 1202, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the invention.

A number of program modules can be stored in the drives and RAM 1212, including an operating system 1230, one or more application programs 1232, other program modules 1234 and program data 1236. It is appreciated that the invention can be implemented with various commercially available operating systems or combinations of operating systems.

A user can enter commands and information into the computer 1202 through a keyboard 1238 and a pointing device, such as a mouse 1240. Other input devices (not shown) may include a microphone, an IR remote control, a joystick, a game pad, a satellite dish, a scanner, or the like. These and other input devices are often connected to the processing unit 1204 through a serial port interface 1242 that is coupled to the system bus 1208, but may be connected by other interfaces, such as a parallel port, a game port, a universal serial bus ("USB"), an IR interface, etc. A monitor 1244 or other type of display device is also connected to the system bus 1208 via an interface, such as a video adapter 1246. In addition to the monitor 1244, a computer typically includes other peripheral output devices (not shown), such as speakers, printers etc.

The computer 1202 may operate in a networked environment using logical connections via wired and/or wireless communications to one or more remote computers, such as a remote computer(s) 1248. The remote computer(s) 1248 may be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include a local area network (LAN) 1252 and a wide area network (WAN) 1254. Such networking environments are commonplace in offices, enterprise-wide computer networks, intranets and the Internet.

When used in a LAN networking environment, the computer 1202 is connected to the local network 1252 through a wired or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 typically includes a modem 1258, or is connected to a communications server on the LAN, or has other means for establishing communications over the WAN 1254, such as the Internet. The modem 1258, which may be internal or external and a wired or wireless device, is connected to the system bus 1208 via the serial port interface 1242. In a networked environment, program modules depicted relative to the computer 1202, or portions thereof, may be stored in the remote memory storage device 1250. It will be appreciated that the network connections shown are exemplary and other means of establishing a communications link between the computers may be used.

The computer 1202 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 1202 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 13:
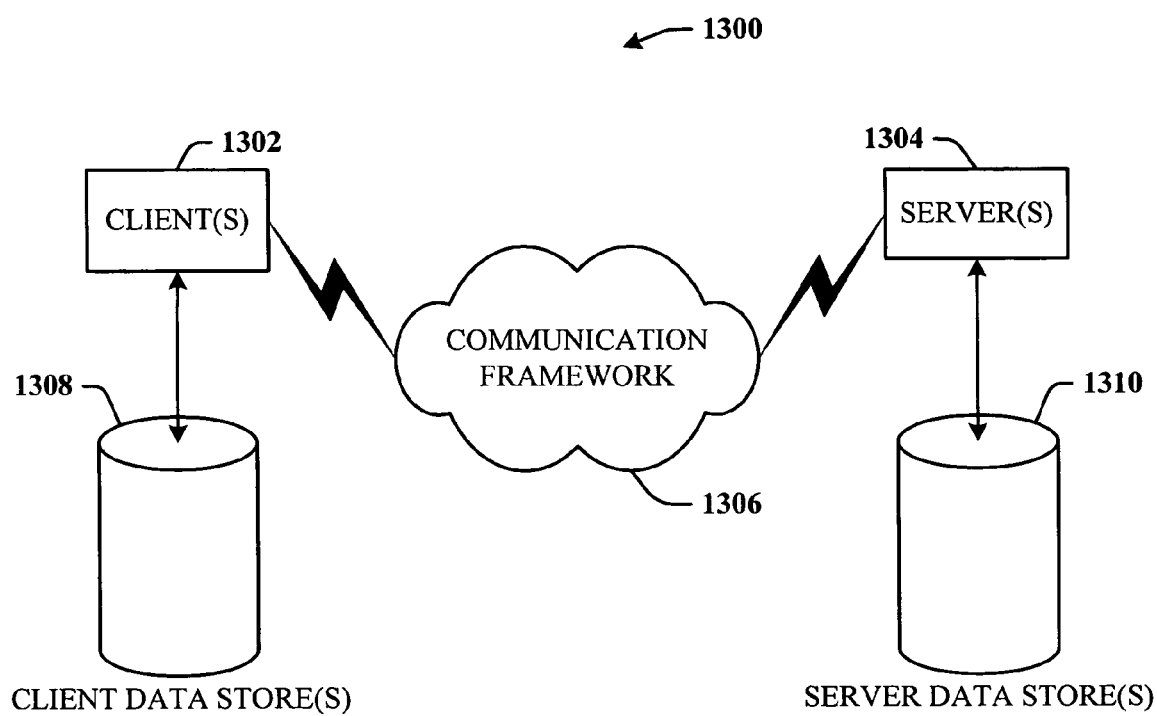

Referring now to FIG. 13, there is illustrated a schematic block diagram of an exemplary computing environment 1300 in accordance with the invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example. The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 may be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications may be facilitated via a wired (including optical fiber) and/or wireless technology. The client(s) 1302 are operably connected to one or more client data store(s) 1308 that can be employed to store information local to the client(s) 1302 (e.g., cookie(s) and/or associated contextual information). Similarly, the server(s) 1304 are operably connected to one or more server data store(s) 1310 that can be employed to store information local to the servers 1304.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that warps a two-dimensional image, comprising:
   an input component that receives the two-dimensional image; and
   a warp component that maps output pixel offset values in floating point format to input pixel coordinates and linearizes the output pixel offset values via converting the output pixel offset values for each pixel into an integer grid value and integer offset values for respective pixel(s), the warp component determines a floating point remainder for each of an x-offset value and a y-offset value for a given pixel, converts each floating point remainder to an integer remainder value by multiplying the floating point remainder by the width of a sub-pixel grid and truncates the product to obtain an x-offset integer value and a y-offset integer value and determines the integer grid value from the integer remainder values;
   wherein the integer offset value is utilized to determine a location of a pixel and the integer grid value is utilized to identify a suitable warping algorithm for warping the two-dimensional image.

2. The system of claim 1, wherein the warp component partitions the pixel into the sub-pixel grid of a predetermined height and width.

3. The system of claim 1, wherein determining the floating point remainders comprises truncating each of the x-offset and the y-offset floating point values and subtracting the truncated values from their respective floating point values.

4. The system of claim 1, further comprising a one-dimensional array of structures that store integer values, wherein each of the structures comprises integer offset values that represent the position of the pixel relative to all other pixels, and the integer grid value, which represents the position of the pixel center within the sub-pixel grid.

5. The system of claim 4, wherein the warp component reads the one-dimensional array of structures to obtain the integer offset values and the integer grid values on a per-pixel basis during a warp.

6. The system of claim 1, wherein the warp component utilizes a warping algorithm to interpolate pixel information from surrounding pixels based at least in part on the integer grid value.

7. The system of claim 6, wherein the warping algorithm is a nearest neighbor interpolation algorithm.

8. The system of claim 2, wherein the height of the sub-pixel grid is equal to the width of the sub-pixel grid.

9. The system of claim 8, wherein sub-pixel regions within the sub-pixel grid are numbered from left to right in descending rows, from 0 to N, where N is an integer equal to the product of the height and width of the sub-pixel region, minus one.

10. The system of claim 9, wherein the integer grid value is within the range [0,N].

11. A method for rapidly warping a two-dimensional image, comprising:
   generating a table of warp coordinates that maps output pixel location in floating point format to input pixel location;
   converting floating point output pixel offset values on a per-pixel basis into integer offset values and an integer grid value that represents a region of a sub-pixel grid in which a pixel's center is positioned;
   determining a floating point remainder for each of an x-offset value and a y-offset value for a given pixel;
   converting each floating point remainder to an integer remainder value by multiplying the floating point remainder by the width of the sub-pixel grid and truncating the product to obtain an x-offset integer value and a y-offset integer value;
   determining the integer grid value from the integer remainder values;
   encoding a structure within a one-dimensional array of structures with the integer offset values and the integer grid value; and
   employing the integer offset values during warping to identify an output pixel, and the integer grid value to identify surrounding pixels from which information will be interpolated.

12. The method of claim 11, wherein x- and y-integer offset values are determined via truncating the floating point warp coordinate values.

13. The method of claim 11, wherein determining the floating point remainders comprises truncating each of the x-offset and the y-offset floating point values and subtracting the truncated values from their respective floating point values.

14. The method of claim 11, wherein determining the integer grid value of a pixel from the integer remainder values comprises multiplying the y-offset integer value by the width of the sub-pixel grid and summing the product with the x-offset integer value.

15. The method of claim 11, further comprising performing a single table lookup per output pixel to find the structure associated with the output pixel during a warp.

16. The method of claim 15, further comprising performing a series of table lookups on a table that is indexed on the possible integer grid values for the output pixel to determine which of a plurality of surrounding pixels should be selected for pixel data interpolation.

17. The method of claim 16, wherein the set of possible integer grid values for the output pixel is [0,(H*W−1)], where H and W are integers representing the height and width, respectively, of the sub-pixel grid.

18. A method for high-speed digital image warping, comprising:
   generating a warp table that maps output pixel locations in floating point format to input pixel locations;
   pre-converting floating-point pixel location information to integer pixel information by determining a floating point remainder for each of an x-offset value and a y-offset value for a given pixel, converting each floating point remainder to an integer remainder value by multiplying the floating point remainder by the width of the sub-pixel grid and truncating the product to obtain an x-offset integer value and a y-offset integer value, and determining an integer grid value from the integer remainder value;
   generating an away of structures comprising integer information for each pixel in an image; and
   warping the image based at least in part on integer information in the structures.

19. The method of claim 18, wherein the integer information further comprises an integer offset value.

20. The method of claim 18, wherein warping the image further comprises:
   performing a table lookup based on offset values for a given source pixel; and
   performing a series of subsequent table lookups on a table indexed on the integer grid value of the source pixel to determine appropriate percentages of information to interpolate from neighboring pixels.

21. The method of claim 20, further comprising interpolating information from neighboring pixels as determined by an interpolation algorithm that is selected based at least in part on the integer grid value.

22. A system that facilitates rapid warping of a digital image, comprising:
   means for converting output pixel information from a two-dimensional floating-point format to a one-dimensional integer format;
   means for determining a floating point remainder for each of an x-offset value and a y-offset value for a each pixel;
   means for converting each floating point remainder to an integer remainder value by multiplying the floating point remainder by the width of the sub-pixel grid and truncating the product to obtain an x-offset integer value and a y-offset integer value;
   means for determining an integer grid value for each pixel from the integer remainder values for each pixel;
   means for generating an array of structures, wherein each structure comprises the integer grid value and an integer offset values for a single pixel; and
   means for interpolating pixel information from neighboring pixels to warp an image based at least in part on the integer grid values.

23. The system of claim 22, further comprising means for outputting a warped image to a user.

24. A computer-readable medium having stored thereon computer executable components of the system of claim 1.

* * * * *

UNITED STATES PATENT AND TRADEMARK OFFICE
CERTIFICATE OF CORRECTION

| | | |
|---|---|---|
| PATENT NO. | : 7,379,623 B2 | |
| APPLICATION NO. | : 10/927371 | |
| DATED | : May 27, 2008 | |
| INVENTOR(S) | : Eric Rudolph | |

It is certified that error appears in the above-identified patent and that said Letters Patent is hereby corrected as shown below:

In column 20, line 18, in Claim 18, delete "away" and insert -- array --, therefor.

Signed and Sealed this
Third Day of May, 2011

David J. Kappos
*Director of the United States Patent and Trademark Office*